United States Patent Office 3,166,553
Patented Jan. 19, 1965

3,166,553
2β,19-EPOXY-3α-HALO-5α-ANDROSTAN-17-ONES AND DERIVATIVES THEREOF
Raymond E. Counsell, Skokie, and Paul D. Klimstra, Northbrook, Ill., assignors to G. D. Searle & Co., Chicago, Ill., a corporation of Delaware
No Drawing. Filed July 9, 1963, Ser. No. 293,839
12 Claims. (Cl. 260—239.55)

The present invention is concerned with novel steroids of the androstane series, characterized by a 2β,19-epoxy structure, and, more particularly, with 2β,19-epoxy-3α-halo-5α-androstan-17-ones and the corresponding optionally 17α-(aliphatic hydrocarbon) substituted 17β-ols together with the 17-(lower alkanoates) thereof. These compounds can be represented by the following structural formulas

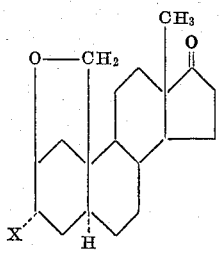

and

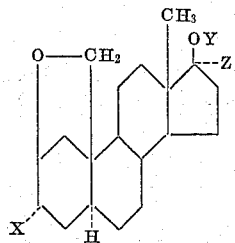

wherein X is a halogen characterized by an atomic weight of less than 100, Y can be hydrogen or a lower alkanoyl radical, and Z symbolizes hydrogen or a lower aliphatic hydrocarbon radical.

Examples of lower alkanoyl radicals depicted in the foregoing structural representation are acetyl, propionyl, butyryl, valeryl, caproyl, and the branched-chain groups isomeric therewith. The lower aliphatic hydrocarbon radicals represented by Z in that structural formula are specifically illustrated by methyl, ethyl, isopropyl, secondary-butyl, hexyl, ethynyl, vinyl, propynyl, butenyl, hexynyl, hexenyl, and the corresponding branched-chain isomeric groups. The halogens contemplated by the X term are fluorine, chlorine, and bromine.

Suitable as starting materials for the manufacture of the compounds of the present invention are those 3α-halo-2β-hydroxy compounds represented by the structural formulas

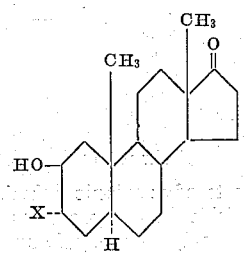

and

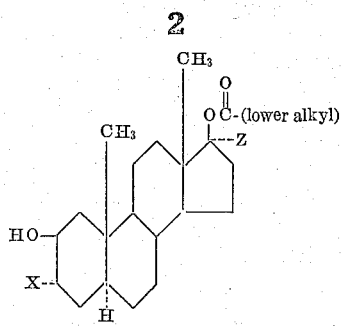

wherein X is indicative of a halogen of atomic weight less than 100 and Z is hydrogen or a lower aliphatic hydrocarbon radical. Their manufacture is described in U.S. Patent 3,018,298, issued on January 23, 1962. Oxidation of those halohydrins with a suitable reagent such as lead tetraacetate, lead tetraacetate with iodine, mercuric acetate with iodine, or silver acetate with iodine in a suitable inert organic solvent such as carbon tetrachloride, chloroform, methylene chloride, benzene, toluene, xylene, etc., affords the corresponding 2β-19-epoxy derivatives. A specific example of that process is the reaction of 3α-bromo-2β-hydroxy-5α-androstan-17-one in carbon tetrachloride with lead tetraacetate and iodine, resulting in 3α-bromo-2β,19-epoxy-5α-androstan-17-one. Similarly, the reaction of 3α-bromo-5α-androstane-2β,17β-diol 17-acetate with that reagent results in 3α-bromo-2β,19-epoxy-5α-androstan 17β-ol 17-acetate.

The 17-hydroxy compounds of this invention can be prepared alternatively by reduction of the corresponding 17-ones. Suitable reagents for this purpose are sodium borohydride, lithium aluminum hydride, and lithium tri-(tertiary-butoxy) aluminum hydride. The aforementioned 3α-bromo-2β,19-epoxy-5α-androstan-17-one, as a specific illustration, is contacted with sodium borohydride in ethanol at room temperature, and the resulting product is isolated to afford 3α-bromo-2β,19-epoxy-5α-androstan-17β-ol. Esterification of the instant 17-hydroxy derivatives with a suitable acylating agent, i.e., a lower alkanoic acid anhydride or halide, in the presence of an alkaline catalyst such as pyridine or triethylamine, provides an alternate route to the 17β-hydroxy 17-(lower alkanoates) herein described. Acylation of 3α-bromo-2β,19-epoxy-5α-androstan-17β-ol, for example, with acetic anhydride in pyridine affords 3α-bromo-2β,19-epoxy-5α-androstan-17β-ol 17-acetate.

The instant derivatives possessing a lower aliphatic hydrocarbon substituent at the 17-position can be obtained also by reaction of the aforementioned 17-ones with the appropriate organometallic reagent. The use of alkyl Grignard reagents or lithium alkyls, for example, produces the corresponding 17α-(lower alkyl)-17β-ols. Typically, 3α-bromo-2β,19-epoxy-5α-androstan-17-one in ether solution is heated with ethereal methyl magnesium bromide to produce 3α-bromo-2β,19-epoxy-17α-methyl-5α-androstan-17β-ol. When a lithium alkynylide is the organometallic reagent, the instant 17α-alkynyl-17β-ols are produced. The latter 17-one, for example, affords 3α - bromo-2β,19-epoxy-17α-ethynyl-5α-androstan-17β-ol upon reaction with lithium acetylide in the form of its ethylene diamine complex, the process being conducted in tetrahydrofuran solution at room temperature. Those 17-alkynyl derivatives can be obtained also by reacting the 17-ketone with the appropriate lower alkyne in the presence of an alkaline catalyst such as potassium hydroxide.

A preferred route to the instant 17α-(lower alkyl)-17β-hydroxy compounds, wherein the alkyl group contains more than one carbon atom, involves catalytic hydrogenation of the corresponding 17α-(lower alkynyl)-17β-ols. Catalysts which may be utilized are typified by palladium-on-carbon, platinum oxide, and Raney nickel. This reduction process is exemplified by the hydrogenation of the above-described 3α-bromo-2β,19-epoxy-17α-ethynyl-5α-androstan-17β-ol in ethanol in the presence of 5% palladium-on-carbon catalyst to yield 3α-bromo-2β,19-epoxy-17α-ethyl-5α-androstan-17β-ol.

An alternate procedure leading to the instant 17α-(lower alkenyl)-17β-ols involves partial reduction of the corresponding 17α-(lower alkynyl) compounds. The preferred catalyst for this purpose is 5% palladium-on-carbon, and the process is suitably conducted in an organic amine solvent such as pyridine. By that procedure, the aforementioned 3α-bromo-2β,19-epoxy-17α-ethylyl-5α-androstan-17β-ol, for example, is converted to 3α-bromo-2β,19-epoxy-17α-vinyl-5α-androstan-17β-ol.

An acylation process particularly suitable for the preparation of the instant 17β-ol 17-(lower alkanoates) which carry a 17-(aliphatic hydrocarbon) substituent involves the use of an isopropenyl ester in the presence of an acidic catalyst. That procedure is exemplified by the reaction of 3α-bromo-2β,19-epoxy-17α-methyl-5α-androstan-17β-ol with isopropenyl acetate in the presence of p-toluenesulfonic acid to afford 3α-bromo-2β,19-epoxy-17α-methyl-5α-androstan-17β-ol 17-acetate.

The compounds of this invention are characterized by valuable pharmacological properties. In particular, they are hormonal and anti-hormonal agents as is evidenced by their anabolic, androgenic, and anti-estrogenic properties.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.) and quantities of materials in parts by weight unless otherwise noted.

*Example 1*

To a solution of 18.5 parts of 3α-bromo-2β-hydroxy-5α-androstan-17-one in 1600 parts of carbon tetrachloride is added 67 parts of lead tetraacetate and 25.4 parts of iodine, and the resulting reaction mixture is heated at the reflux temperature for about 8 hours, then is allowed to stand at room temperature for about 16 hours. The mixture is filtered, and the filter cake is washed with methylene chloride. This organic solution is washed successively with 10% aqueous sodium thiosulfate and water, then is dried over anhydrous sodium sulfate and stripped of solvent at reduced pressure. The residue is dissolved in a 1:1 hexane-benzene solution, then is chromatographed on a silica gel column. The column is eluted, first with benzene then with benzene containing increasing amounts of ethyl acetate. The 5% ethyl acetate in benzene eluate affords a fraction which, after recrystallization from methanol, results in 3α-bromo-2β,19-epoxy-5α-androstan-17-one, melting at about 130–132°. It is characterized further by an optical rotation of +87° in chloroform and also by the structural formula

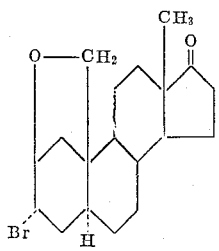

*Example 2*

The substitution of 16.2 parts of 3α-chloro-2β-hydroxy-5α-androstan-17-one in the procedure of Example 1 results in a 3α-chloro-2β,19-epoxy-5α-androstan-17-one.

*Example 3*

By substituting 15.4 parts of 3α-fluoro-2β-hydroxy-5α-androstan-17-one and otherwise proceeding according to the processes described in Example 1, 2β,19-epoxy-3α-fluoro-5α-androstan-17-one is obtained.

*Example 4*

To a solution of 2 parts of 3α-bromo-2β,19-epoxy-5α-androstan-17-one in 32 parts of ethanol is added, portionwise with stirring, one part of sodium borohydride. This reaction mixture is kept at room temperature for about 20 hours, then is poured into approximately 100 parts of volume by 2% aqueous ammonium chloride. The resulting precipitate is collected by filtration, washed with water, and dried. Recrystallization of this crude product from methanol-acetone affords 3α-bromo-2β,19-epoxy-5α-androstan-17β-ol, melting at about 165–167°. It displays an optical rotation of +24° in chloroform and is characterized also by the structural formula

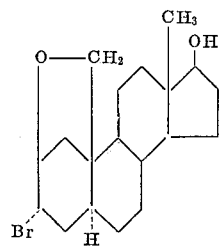

*Example 5*

The substitution of 1.76 parts of 3α-chloro-2β,19-epoxy-5α-androstan-17-one in the procedure of Example 4 results in 3α-chloro-2β,19-epoxy-5α-androstan-17β-ol.

*Example 6*

The reduction of 1.66 parts of 3α-fluoro-2β,19-epoxy-5α-androstan-17-one by the processes described in Example 4 affords 2β,19-epoxy-3α-fluoro-5α-androstan-17β-ol.

*Example 7*

A mixture of one part of 3α-bromo-2β,19-epoxy-5α-androstan-17β-ol, 2 parts of acetic anhydride, and 20 parts of pyridine is stored at room temperature for about 16 hours, then is poured carefully into a mixture of ice and water. The resulting solid which precipitates is collected by filtration, washed on the filter with water, and dried to afford 3α-bromo-2β,19-epoxy-5α-androstan-17β-ol 17-acetate, melting at about 138–140° and characterized further by an optical rotation of +20° in chloroform. This substance can be represented by the structural formula

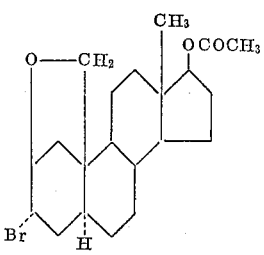

*Example 8*

When 2.55 parts of propionic anhydride is substituted for acetic anhydride in the processes described in Example 7, 3α-bromo-2β,19-epoxy-5α-androstan-17β-ol 17-propionate is obtained.

Example 9

By substituting 0.88 part of 3α-chloro-2β,19-epoxy-5α-androstan-17β-ol and otherwise proceeding according to the processes described in Example 7, 3α-chloro-2β,19-epoxy-5α-androstan-17β-ol 17-acetate is obtained.

Example 10

When 0.83 part of 2β,19-epoxy-3α-fluoro-5α-androstan-17β-ol is acetylated according to the processes described in Example 7, 2β,19-epoxy-3α-fluoro-5α-androstan-17β-ol 17-acetate is produced.

Example 11

To a solution of 15 parts by volume of 3 molar ethereal methyl magnesium bromide in 14 parts of ether is added a solution of one part of 3α-bromo-2β,19-epoxy-5α-androstan-17-one in 63 parts of ether, and the resulting solution is stirred at room temperature. After a few minutes, a sticky dark gray material separates, and the ether layer becomes clear and nearly colorless. At this point an additional quantity of 15 parts by volume of 3 molar ethereal methyl magnesium bromide is added, and this reaction mixture is heated at the reflux temperature for about 16 hours. To the cooled mixture is added 5 parts of solid ammonium chloride, and the resulting mixture is poured into cold water, then is acidified by the addition of dilute hydrochloric acid. The ether layer is separated, washed several times with water, dried over anhydrous sodium sulfate containing decolorizing carbon, then is stripped of solvent at reduced pressure. The resulting white solid residue is recrystallized from aqueous methanol to afford 3α-bromo-2β,19-epoxy-17α-methyl-5α-androstan-17β-ol, melting at about 174–175°. It displays an optical rotation of +7° in chloroform and is further characterized by the structural formula

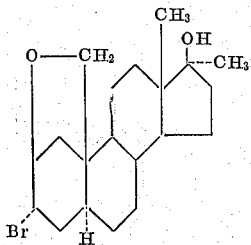

Example 12

The reaction of 0.88 part of 3α-chloro-2β,19-epoxy-5α-androstan-17-one with methyl magnesium bromide according to the processes described in Example 11 yields 3α-chloro-2β,19-epoxy-17α-methyl-5α-androstan-17β-ol.

Example 13

By substituting 0.83 part of 2β,19-epoxy-3α-fluoro-5α-androstan-17-one and otherwise proceeding according to the procedure described in Example 11, 2β,19-epoxy-3α-fluoro-17α-methyl-5α-androstan-17β-ol is obtained.

Example 14

To a solution of 2.5 parts of a 30% lithium acetylide-70% ethylene diamine complex in 22 parts of tetrahydrofuran, under nitrogen, is added a solution of one part of 3α-bromo-2β,19-epoxy-5α-androstan-17-one in 8.8 parts of tetrahydrofuran over a period of about 5 minutes. The resulting reaction mixture is stirred at room temperature for about 2¼ hours, at the end of which time 2 parts of solid ammonium chloride and approximately 0.1 part of 25% aqueous tetrahydrofuran are successively added. The resulting mixture is poured into cold water, and this aqueous mixture is acidified by the addition of dilute hydrochloride acid. The resulting oil is extracted into ether, and the organic layer is washed successively with dilute aqueous sodium bicarbonate and water, then is dried over anhydrous sodium sulfate containing decolorizing carbon and is concentrated to an oil at reduced pressure. Crystallization of this oil from aqueous methanol affords 3α-bromo-2β,19-epoxy-17α-ethynyl-5α-androstan-17β-ol, melting at about 85.90°. This substance is characterized also by an optical rotation of −16° in chloroform and by the structural formula

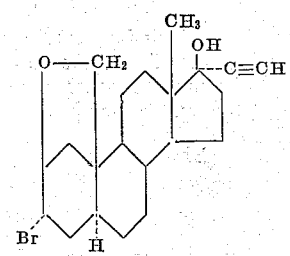

Example 15

By substituting 0.88 part of 3α-chloro-2β,19-epoxy-5α-androstan-17-one and otherwise proceeding according to the processes described in Example 14, 3α-chloro-2β,19-epoxy-17α-ethynyl-5α-androstan-17β-ol is obtained.

Example 16

The ethynylation of 0.83 part of 2β,19-epoxy-3α-fluoro-5α-androstan-17-one by the procedure described in Example 14 results in 2β,19-epoxy-17α-ethynyl-3α-fluoro-5α-androstan-17β-ol.

Example 17

A mixture of 2.34 parts of 3α-bromo-2β,19-epoxy-17α-ethynyl-5α-androstan-17β-ol, 0.25 part of 5% palladium-on-carbon catalyst, and 200 parts of pyridine is stirred in a hydrogen atmosphere at atmospheric pressure and room temperature until one molecular equivalent of hydrogen is absorbed. The catalyst is removed by filtration, and the filtrate is stripped of solvent at reduced pressure to afford a residual oil. Crystallization of that oil from aqueous methanol affords pure 3α-bromo-2β,19-epoxy-17α-vinyl-5α-androstan-17β-ol, melting at about 142–145° and characterized further by an optical rotation of +15.5° in chloroform and also by the structural formula

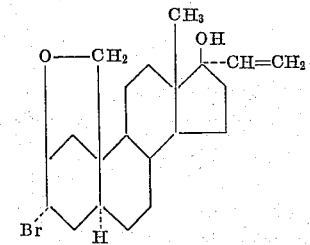

Example 18

The catalytic reduction of 2.08 parts of 3α-chloro-2β,19-epoxy-17α-ethynyl-5α-androstan-17β-ol according to the procedure of Example 17 affords 3α-chloro-2β,19-epoxy-17α-vinyl-5α-androstan-17β-ol.

Example 19

The substitution of 1.98 parts of 2β,19-epoxy-17α-ethynyl-3α-fluoro-5α-androstan-17β-ol in the procedure described in Example 17 results in 2β,19-epoxy-3α-fluoro-17α-vinyl-5α-androstan-17β-ol.

Example 20

To a solution of one part of 3α-bromo-2β,19-epoxy-17α-methyl-5α-androstan-17β-ol in 18.4 parts of isopropenyl acetate is added 0.15 part of p-toluenesulfonic acid, and the resulting mixture is heated at the reflux temperature for about 6 hours with intermittent removal of the solven by distillation. To the cooled solution is added approximately 70 parts of ether, and this mixture is washed successively with water, 10% aqueous sodium carbonate, and water, then is dried over anhydrous sodium sulfate and stripped of solvent at reduced pressure. The oily residue is crystallized from ethanol to afford pure 3α-bromo - 2β,19-epoxy-17α-methyl-5α-androstan-17β-ol 17-acetate.

*Example 21*

By substituting 21 parts of isopropenyl propionate and otherwise proceeding according to the processes described in Example 20, 3α-bromo-2β,19-epoxy-17α-methyl-5α-androstan-17β-ol 17-propionate is obtained.

*Example 22*

The acetylation of 0.88 part of 3α-chloro-2β,19-epoxy-17α-methyl-5α-androstan-17β-ol according to the processes of Example 20 affords 3α-chloro-2β,19-epoxy-17α-methyl-5α-androstan-17β-ol 17-acetate.

*Example 23*

The reaction of 0.84 part of 2β,19-epoxy-3α-fluoro-17α-methyl-5α-androstan-17β-ol with isopropenyl acetate according to the procedure of Example 20 results in 2β,19-epoxy-3α-fluoro-17α-methyl-5α-androstan-17β-ol 17 - acetate.

*Example 24*

To a solution of 1.5 parts of 3α-bromo-2β,19-epoxy-17α-ethynyl-5α-androstan-17β-ol in 20 parts of ethanol is added 0.15 part of 5% palladium-on-carbon catalyst, and this reaction mixture is shaken in a hydrogen atmosphere at atmospheric pressure and room temperature until 2 molecular equivalents of hydrogen are absorbed. Filtration of this mixture removes the catalyst, which is then washed on the filter with ethanol. The resulting filtrate is concentrated to dryness at reduced pressure, and the residue is crystallized from aqueous ethanol to afford 3α-bromo-2β,19-epoxy-17α-ethyl-5α-androstan-17β-ol.

*Example 25*

By substituting 1.04 parts of 3α-bromo-2β,19-epoxy-17α-ethyl-5α-androstan-17β-ol and otherwise proceeding according to the procedure of Example 20, 3α-bromo-2β,19-epoxy-17α-ethyl-5α-androstan-17β-ol 17-acetate is obtained.

*Example 26*

A solution of 6 parts of 1-butyne and 40 parts of cold ether is added portionwise, in the course of about 30 minutes, to a solution of butyl lithium, which is prepared from 17.3 parts of 1-bromobutane and 2.2 parts of lithium wire in 27 parts of ether. After completion of the addition, the mxture is stirred for about 90 minutes at about 0°. To this ethereal solution of butynyl lithium is added, over a period of about 30 minutes, a solution of 12.8 parts of 3α-bromo-2β,19-epoxy-5α-androstan-17-one in 100 parts of tetrahydrofuran. After completion of the addition, the ether is removed by distillation, keeping the volume essentially constant by the addition of tetrahydrofuran. This mixture is heated at the reflux temperature for about 3 hours, then is poured into water, and the resulting aqueous mixture is cooled in an ice bath. The resulting oily layer is extracted into ether, and the ethereal solution is washed successively with water and saturated aqueous sodium chloride, then is dried over anhydrous sodium sulfate, and is concentrated to dryness under reduced pressure to afford 3α-bromo-17α-(1-butynyl)-2β-19-epoxy-5α-androstan-17β-ol.

*Example 27*

The reduction of 2.51 parts of 3α-bromo-17α-(1-butynyl)-2β,19-epoxy-5α-androstan-17β-ol according to the procedure described in Example 17 results in 3α-bromo-17α-(1-butenyl)-2β,19-epoxy-5α-androstan-17β-ol.

What is claimed is:
1. A member selected from the group consisting of compounds of the formulas

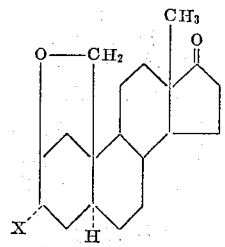

and

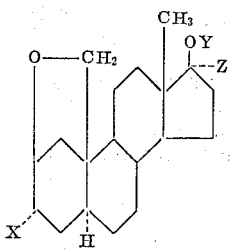

wherein X represents a halogen of atomic weight less than 100, Y is selected from the group consisting of hydrogen and radicals of the formula

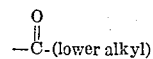

and Z is a member of the class consisting of hydrogen and lower aliphatic hydrocarbon radicals.

2. 3α-bromo-2β,19-epoxy-5α-androstan-17β-ol 17-acetate.
3. A compound of the formula

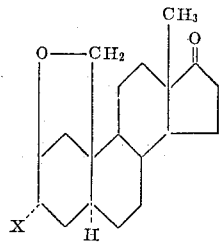

wherein X represents a halogen of atomic weight less than 100.

4. 3α-bromo-2β,19-epoxy-5α-androstan-17-one.
5. A compound of the formula

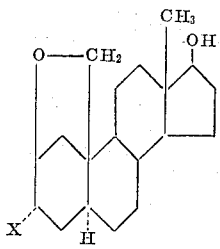

wherein X represents a halogen of atomic weight less than 100.

6. 3α-bromo-2β,19-epoxy-5α-androstan-17β-ol.
7. A compound of the formula

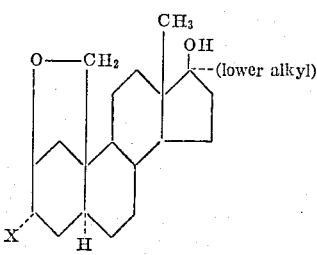

wherein X represents a halogen of atomic weight less than 100.
8. 3α-bromo-2β,19-epoxy-17α-methyl-5α-androstan-17β-ol.
9. A compound of the formula
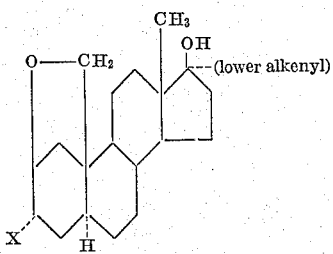
wherein X represents a halogen of atomic weight less than 100.
10. 3α-bromo-2β,19-epoxy-17α-vinyl-5α-androstan-17β-ol.
11. A compound of the formula
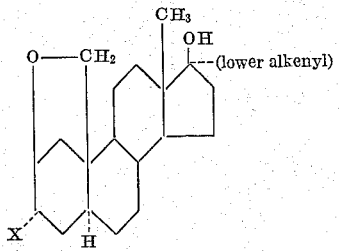
wherein X represents a halogen of atomic weight less than 100.
12. 3α-bromo-2β,19-epoxy-17α-ethynyl-5α-androstan-17β-ol.
No references cited.

UNITED STATES PATENT OFFICE
CERTIFICATE OF CORRECTION

Patent No. 3,166,553　　　　　　　　　　　　January 19, 1965

Raymond E. Counsell et al.

It is hereby certified that error appears in the above numbered patent requiring correction and that the said Letters Patent should read as corrected below.

Column 2, line 24, for "2β-19-epoxy" read -- 2β,19-epoxy --; column 4, line 19, for "of volume by" read -- by volume of --; column 7, line 43, for "3α-bromo-2β-" read -- 3α-bromo-2β,19- --; line 69, for "2β-19" read -- 2β,19 --; column 10, lines 4 to 13, the upper right-hand portion of the formula, for

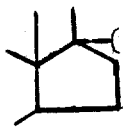(lower alkenyl)　　read　　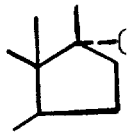(lower alkynyl)

Signed and sealed this 22nd day of June 1965.

(SEAL)
Attest:

ERNEST W. SWIDER　　　　　　　　　　EDWARD J. BRENNER
Attesting Officer　　　　　　　　　　Commissioner of Patents